T. VAN KANNEL.
AMUSEMENT APPARATUS WITH UNDULATING FLOOR.
APPLICATION FILED NOV. 12, 1909.

953,724.

Patented Apr. 5, 1910.
6 SHEETS—SHEET 1.

Witnesses
L. Lee.
J. Walter Greenbaum.

Inventor
Theophilus Van Kannel,
per Thomas S. Crane, Atty.

T. VAN KANNEL.
AMUSEMENT APPARATUS WITH UNDULATING FLOOR.
APPLICATION FILED NOV. 12, 1909.

953,724.

Patented Apr. 5, 1910.
6 SHEETS—SHEET 4.

Fig. 4.

UNITED STATES PATENT OFFICE.

THEOPHILUS VAN KANNEL, OF NEW YORK, N. Y.

AMUSEMENT APPARATUS WITH UNDULATING FLOOR.

953,724.        Specification of Letters Patent.        Patented Apr. 5, 1910.

Application filed November 12, 1909. Serial No. 527,597.

*To all whom it may concern:*

Be it known that I, THEOPHILUS VAN KANNEL, a citizen of the United States, residing at 519 West One hundred and forty-first street, New York, county of New York, and State of New York, have invented certain new and useful Improvements in Amusement Apparatus with Undulating Floors, fully described and represented in the following specification and the accompanying drawings, forming a part of the same.

The present invention relates to an improved means of imparting a series of progressive rising and falling movements, simulating the waves of the sea, to a floor of flexible material for the purpose of propelling vehicles and also of two parallel courses with expanded loops at the opposite ends, and all the means herein described.

In the present invention, a series of reciprocating lifter-rods is used to progressively oscillate a series of pivoted beams or joists which support the floor, and the invention consists primarily in a series of rotating crank-pins to actuate the lifter-rods, which crank-pins may be attached directly to rotating cog-wheels.

In practice, the joists are pivoted at uniform distances apart, as twelve inches, beneath the flexible flooring-plates, and the crank-pins and the gears which carry them, if such be used, are similarly spaced twelve inches apart, so as to actuate one lifter under each of the pivoted joists. Such lifters are operated beneath the joint of two vibrating joists, the ends of which are opposed along the middle of the flexible floor, and I have found that the cog-wheels for supporting the crank-pins may be set with their planes parallel to such joists, or transversely to the same, as the lifter-rod in either case operates efficiently to operate the pivoted joist, beneath which the wheel is mounted.

Where the cog-wheels are set transverse to the joist they may be driven from a common shaft by a pinion upon such shaft for each cog-wheel, but when they are set parallel with the line of the joint the cog-wheels may be meshed directly together and the power for rotating them be applied to the end of the train, or at intermediate points, as may be required.

The use of cog-wheels meshing directly with one another and parallel with the joint of the floor, enables me to employ a curved course and to vibrate the floor with the same facility as a straight course has heretofore been vibrated.

The invention includes the union of a straight course with a curved course, and all the means for supporting and vibrating the beams in angular relations to one another.

The invention also includes the use of a single thickness for the floor-plates, and various means for joining the edges of the plates and keeping their upper surfaces even at their joints.

The invention will be understood by reference to the annexed drawing, in which—

Figure 1 is a plan of the floor of an amusement apparatus embodying the invention; Fig. 1$^a$ is a plan and Fig. 1$^b$ an elevation of an alternate form of gearing; Fig. 1$^c$ shows the shaft-coupling; Fig. 3 is a plan of the preferred form of driving gear; Fig. 3$^a$ shows a shaft with crank at one end and driving-gear at the other; Fig. 7$^a$ shows an alternative arrangement of the gear $h$; Fig. 8$^a$ shows the joint of the floor-plates and joists.

The invention is illustrated in an endless undulating floor having two parallel courses $a, a'$, at the middle, and looped or curved courses $b, b'$ connecting the same at their opposite ends. Any vehicles may traverse this endless floor over and over without any necessity for stopping.

Figures 1, 1C:
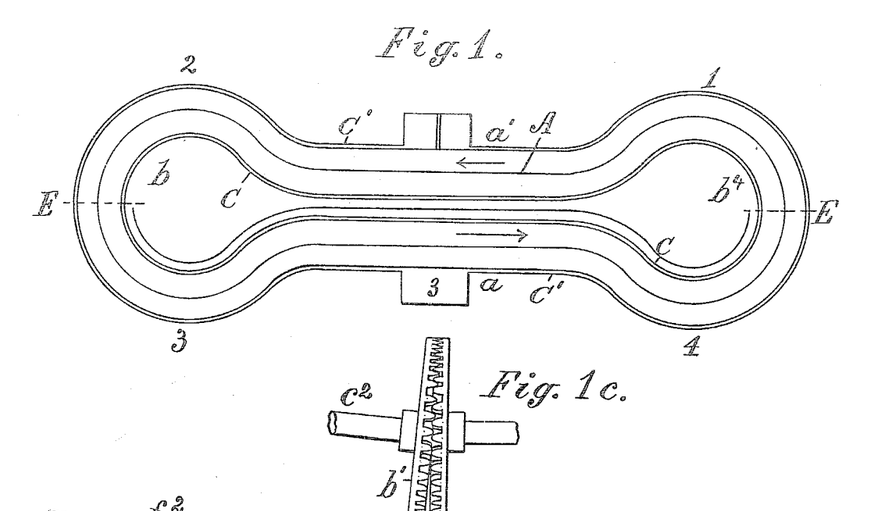
Figure 2:
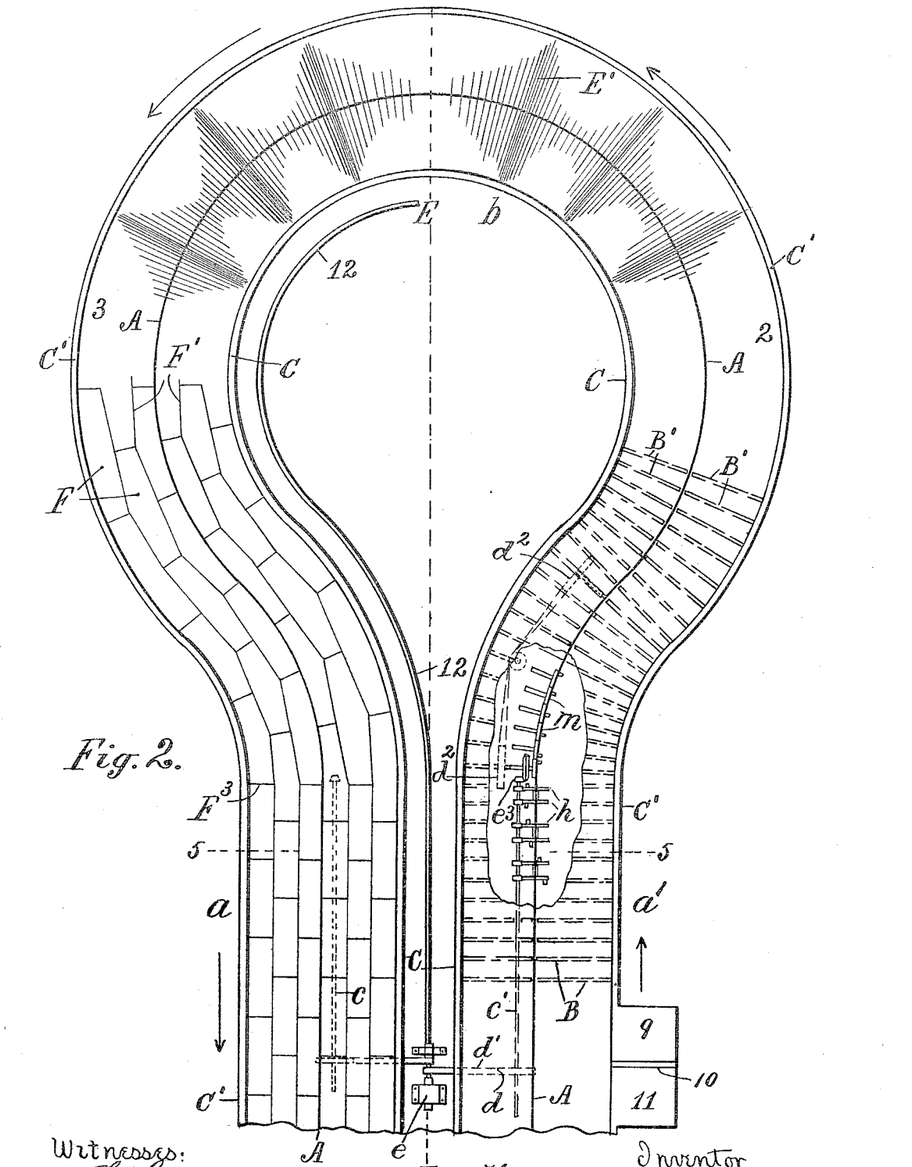
Fig. 2 is a plan of one-half of the course upon a larger scale than Fig. 1 with part of the floor broken away, and illustrations of different features in different parts of the floor.
Figure 16:
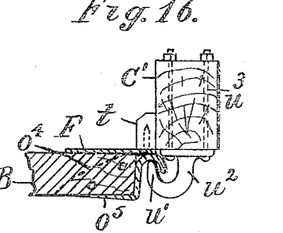
Fig. 16 is a cross section of one of the guard-beams with the connections of the same to the floor-joists and the floor-plate.
Figure 17:
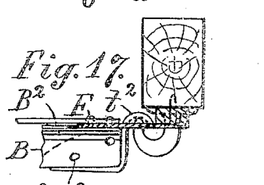
Fig. 17 shows an alternative connection for the floor-plates.

Fig. 2 shows the narrow open joint A at the middle line of the undulating floor, and floor-joists B, B' extended transversely to the course at each side of the joint and pivoted upon guard-beams C, C' at opposite sides of the course by pivot-hangers $t^2$, $u^2$, shown in Figs. 16 and 17. The joists B are parallel under the straight parts of the course $a$, $a'$, and radial or divergent under the looped portions of the course $b$, $b'$, as shown in Fig. 1. The depth of the joists is less toward their ends, where the strain is the least.

Where the floor is broken away in Fig. 2, six toothed crank-wheels $h$ are shown beneath the straight portion of the course, the plane of these wheels being transverse to the joint A, and under the adjoining curved portion of the course, at the commencement of the loop $b$, six toothed crank-wheels $m$ are shown with their planes parallel to the joint A.

Figure 5:
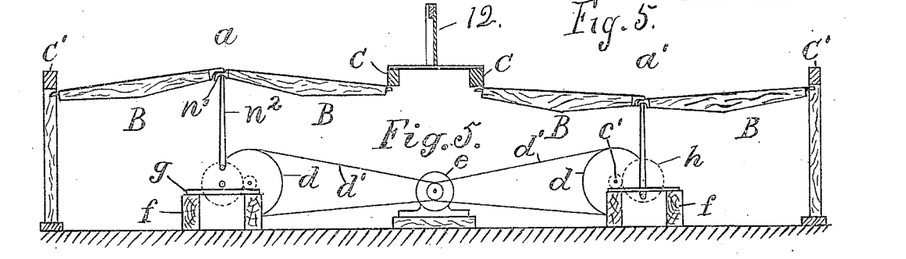
Fig. 5 is a cross section (enlarged) on line 5—5 in Fig. 2.
Figure 6:
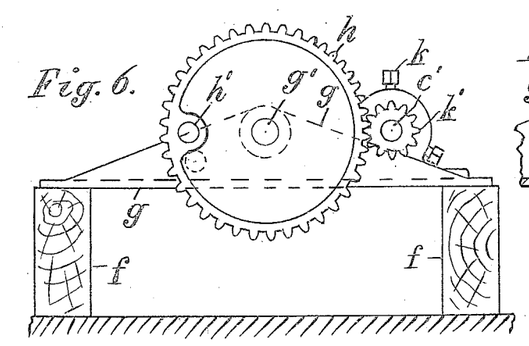
Fig. 6 is a cross section on line 6—6 in Fig. 3.

In Fig. 2, power-shafts $c$ and $c'$ are shown extended parallel with the straight portion of the joint A and driven, as shown in Figs. 2 and 5, by pulleys $d$ and belt connections $d'$ to the spindle of an electric motor $e$.

The motive power for undulating the floor is preferably applied at the middle of its length, and conveyed by gearing through each side of the floor to the center of the floor indicated by the dotted line E—E in Figs. 1 and 2, where the vibrations of the floor are gradually reduced to nothing by a suitable construction of the vibrating mechanism, with gradually reduced cranks.

The wave-motion of the floor at opposite sides of the center E—E and the reduction of the wave-motion to nothing at the line E—E is indicated diagrammatically in Fig. 2 by the shading E'; such shading not being extended over the entire floor in this figure, as the figure is somewhat of a diagrammatic character, to show the floor-plates in one part and the floor-joists and gearing in another. This construction enables independent trains of gearing to be used for undulating the floor at opposite sides of the center line, and the provision of such a dead point obviates the necessity of making the waves upon one side of the center line synchronize with the waves upon the opposite side. Such synchronism would necessitate the connection into one train of all the gearing for the entire floor, which would impose double the strain upon the driving parts that is necessary where the two sides are driven independently.

Where a motor is connected with two trains of gearing upon opposite sides by means of belts, it is obvious that the slipping of the belts would prevent synchronous movements at opposite sides; but this belt-connection is entirely practicable where the dead point E—E is provided.

To carry vehicles readily across the dead point, the floor is sloped upward from 1 to 2 and downwardly from 3 to 4, so that the downward slope as well as the momentum of the vehicles, derived from the preceding wave-action, carries them positively across the dead point.

In Fig. 2, an embarking station 9 is shown at the middle of the straight portion $a'$ and a debarking station 11 adjoining the same, and a partition or wall 12 is shown in Figs. 1, 2 and 5 between the adjacent portions of the course to prevent the passengers in one portion from seeing the passengers in the adjacent portion. This partition extends along the entire guard-beam C. This concealment makes the undulating floor appear longer to the passengers, as they cannot see how far the curved portion extends.

Bearings for the power-shaft and for the crank-gears under the straight courses $a$, $a'$, are mounted upon beams $f$ set parallel with the joint A of the course, bridges $g$ being extended across the beams at intervals, with a bearing upon each carrying a crank-shaft $g'$ with toothed crank-gears $h$ upon its opposite ends provided with crank-pins $h'$. The crank-pins carry lifters $n^2$ fitted to sockets $n'$ on the joists. (Figs. 3 and 4.)

Figure 7:
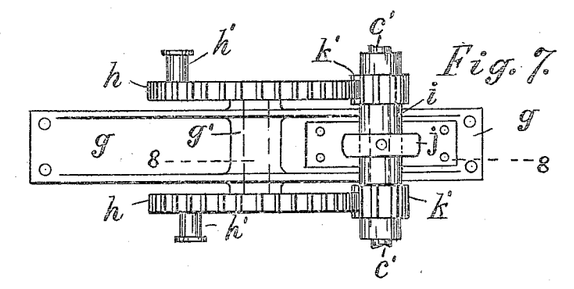
Fig. 7 is a plan of the bridge and gears shown in Fig. 6.
Figure 8:
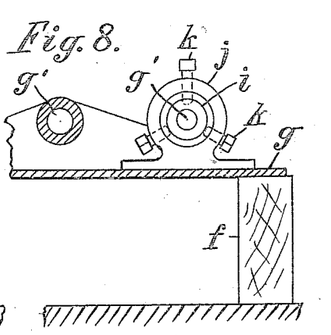
Fig. 8 is a cross section on line 8—8 in Fig. 7.

A bearing $i$ for the power-shaft is mounted adjustably in a stand $j$ upon one end of the bridge, being secured therein by adjusting-screws $k$ as shown in Figs. 7 and 8. Pinions $k'$ are secured upon the power-shaft at opposite ends of the bearing $i$ to mesh with the crank-gears $h$, and the bridges are so spaced upon the beams $f$ that one crank-pin operates under each of the floor-joists B.

Figures 3, 3A:
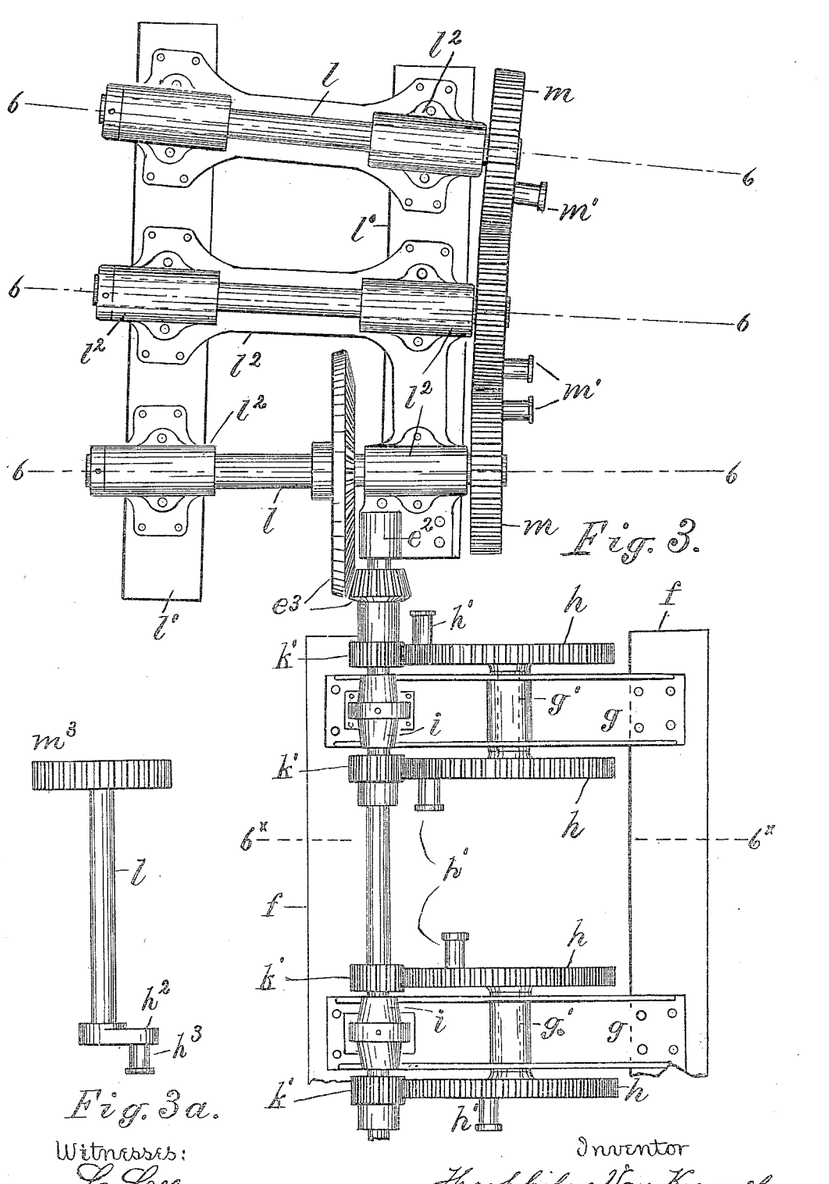
Figure 4:
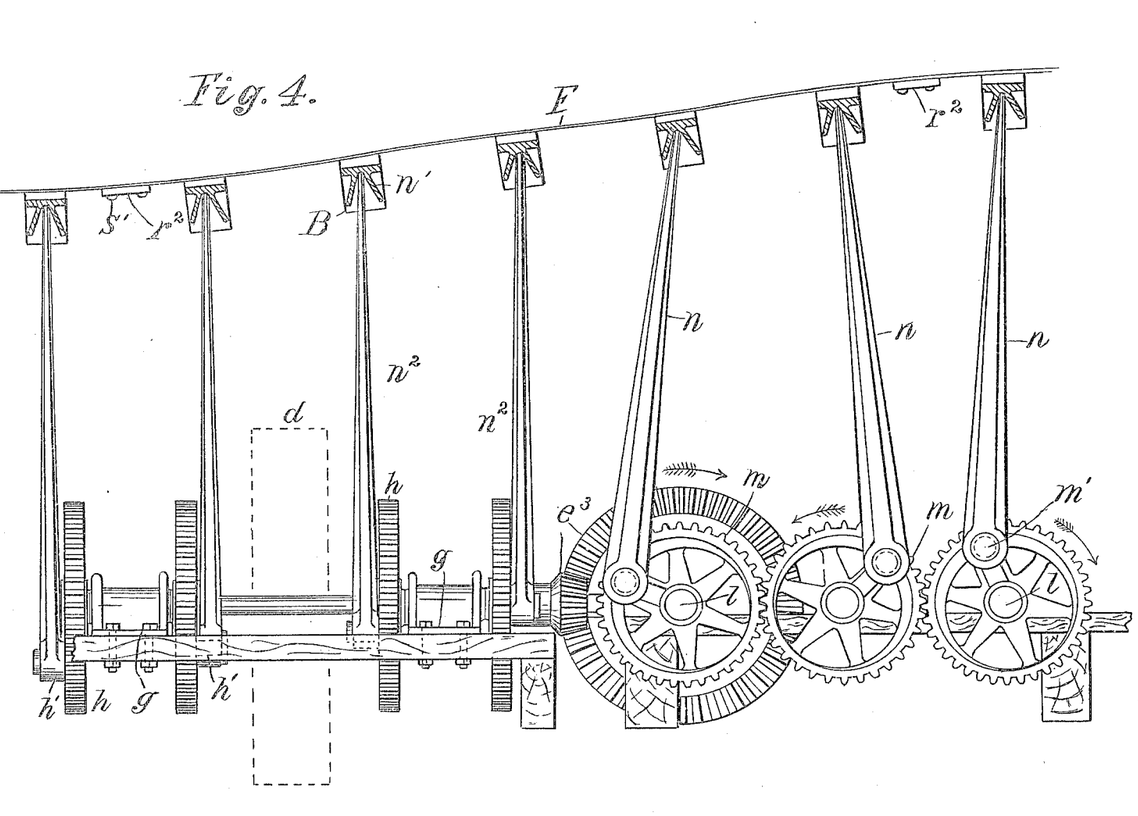
Fig. 4 is an elevation of the parts shown in Fig. 3.

The shafts $l$ for the crank-gears under the curved portions of the course are arranged radially as shown by the dotted lines 6—6 in Fig. 3; having their bearings $l^2$ bolted in groups to the beams $l'$ which extend tangentially to the curve of the course. One of such groups is shown in Fig. 3, with three shafts having toothed crank-wheels $m$ overhung from their bearings and provided each with a crank-pin $m'$.

A straight power-shaft could not be extended around the curved portion of the course, and it is, therefore terminated in a bearing $e^2$ upon the foot of one of the bearings $l^2$, and is connected by bevel-wheels $e^3$ to the first radial shaft $l$.

The gears $m$ are made slightly conical in accordance with the radial relations of their axes, and are meshed together so as to transmit the motion continuously from the straight portion of the course, around the curved portion, to the dead point E.

Fig. 2 shows the motor $e$ at the center portion of the course, and represents the straight shaft as extending toward the curved portion where it terminates at the gears $e^3$, and it will be understood that it extends equally in the opposite direction, so as to undulate the floor upon one entire side of the course from one dead point to the other.

Figure 9:
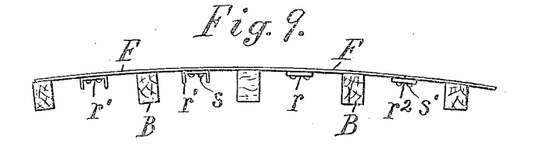
Fig. 9 is a cross section on line 9—9 in Fig. 10.

Only six of the toothed crank-wheels $h$ are shown in Fig. 2 where the floor is broken away, but a succession of such crank-wheels would extend along the straight portion of the course from one loop to the other, and the power-driving-pulley $d$ would be applied to the shaft $c'$ at a point between two of the lifters, as indicated by the dotted lines $d$ in Fig. 4. Other pulleys $d^2$ can be applied, as shown in Fig. 2. The dotted lines 6 in Fig. 3 also represent the centers of the floor-joists above the shafts $l$, and Fig. 4 shows lifters $n$ applied to the crank-pins and fitted to the sockets $n'$ upon the ends of the joists B. The sockets are shown in section in Fig. 4. This figure shows the floor-plate F with the ends of the floor-plate-sections secured together by patches $r^2$ and rivets $s'$ at their joints $F^3$, as shown also in Figs. 9 and 10. Such patches hold the transverse joints of the plates flush with one another.

Figure 8A:
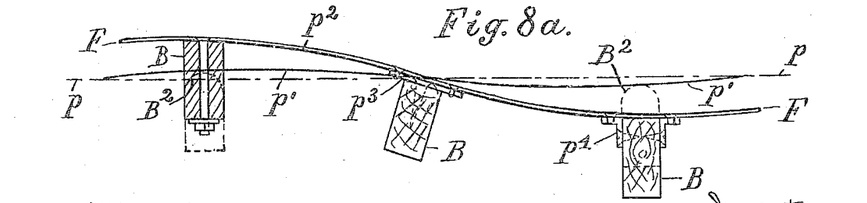

Longitudinal floor-plates F are shown in Fig. 2, with three rows of such plates at each side of the center joint A, the plates breaking joints with one another where their ends $F^3$ are connected, and the ends of the plates being radial in the curved portions of the course, and with the edge of each plate sloped from the middle toward the end, at right angles with such radial portions, as shown in the sloping lines $F'$, in Fig. 2. The edges of the plates adjacent to the guard-beams C, C', and next to the joint A are necessarily curved, but straight lines can be used at all other edges of the plates. It is found that the plates can only be fastened to the joists for a foot or two adjacent to the joint A, for the reason that the joists have a rocking motion which coincides with the rocking motion of the floor-plates adjacent to their joint, while the plates have no motion at the guard-beam C', which may be termed the "shore-line"; which is due to the pivoting of the joists at the shore-line, and the absence of vibration at that line. This is illustrated in Fig. 8ª, where the straight dotted line $p$ represents the shore-line, the flat curve $p'$ represents the curve of the floor-plate a short distance from the shore-line, and the curve $p^2$ represents the curve of the sheet-metal where the full wave-motion occurs, adjacent to the joint A. As the flat top of the joist does not coincide with the curve $p'$, the top of the joist is rounded off as shown at $B^2$, at the end next the pivot-hanger, and such rounding is gradually reduced to a point within a couple of feet of the joint A.

It will be observed that the joint maintains a uniform relation to the floor-plate where in contact with the curve $p^2$, the plates bearing flat upon the joists, and the plate can, therefore, as shown in Fig. 8ª, be securely bolted or fastened to the joists for a couple of feet from the inner end next the joint A, but are not fastened to the rounded portion $B^2$ of the joist, for the remainder of its length, as the plates over such rounded portion of the joists constantly change their relation to the joists, and would rupture any fastenings. Such fastenings may be auxiliary plates $p^3$, or angles $p^4$, secured to the joists and riveted at their edges to the floor-plates F. (Fig. 8ª).

Figure 10:
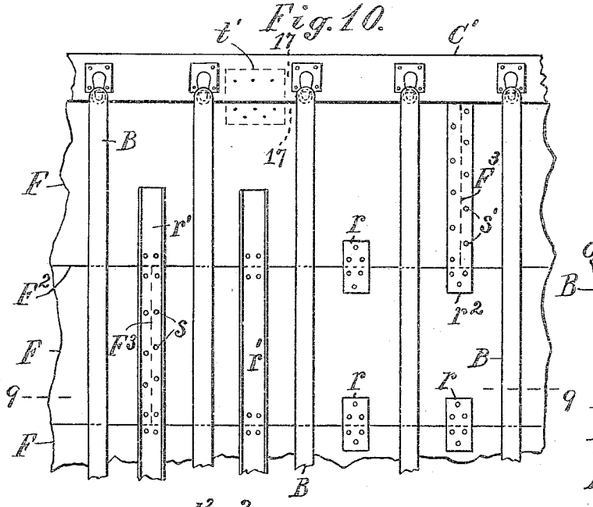
Fig. 10 shows the under side of the guard-beam and floor-joists with the means for joining the floor-plates.

As the plates are not fastened to the joists throughout their length, the longitudinal edges of the plates are necessarily fastened to one another, as by the riveted joint-plates $r$ in Fig. 10, or by the channel-bars $r'$, which cross the plates as well as their longitudinal joints $F^2$, and serve to stiffen the same by reason of the ribs upon the edges of the bars. Such bars may, in some cases, extend over the transverse joint $F^3$ of the floor-plates, and be secured to the opposite edges of such joint as by the rivets $s$, as shown in the left hand part of Fig. 10. The cross-joints $F^3$ may be united by any suitable means, as by the flat plate $r^2$, and the rivets $s'$ in Figs. 4 and 10.

The edge of the plate nearest to the outer guard-beam C', which forms the shore-line of the course, may be secured by screws to a strip $t$ attached to the guard-beam as shown in Fig. 16, or attached to the under side of the guard-beam between the joists, as indicated in Fig. 17, in which case the edge of the floor-plate would have plates $t'$ to overlap upon the under side of the guard-beam as indicated by the dotted line $t'$ in Fig. 10, to be secured thereto.

The lifters $n^2$ which connect the crank-pins $h'$ with the sockets $n'$ upon the floor-joists B are traversed by their crank-pins in a plane parallel with such joists; but the lifters $n$ propelled by the crank-pins $m'$ move in a plane at right angles to the floor-joists; but the plane of movement for the lifters is immaterial, as the floor-plates F hold the joists securely in a given path and the lifters operate with equal efficiency to raise the joists and the floor in whichever direction that may be vibrated.

Figure 13:
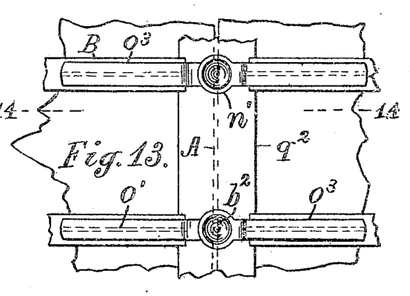
Figs. 13 and 14 are a similar plan and cross section showing an alternative construction for closing the joint of the course.
Figure 14:
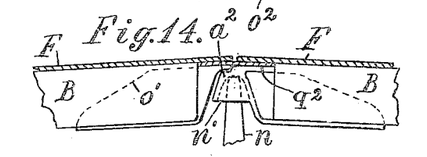
Figure 15:
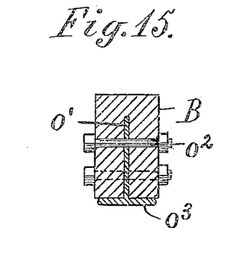
Fig. 15 is a cross section on line 15—15 in Fig. 12.

The sockets $n'$ for the lifters are shown in Figs. 11 to 14 cast with a central plate $o'$ which is fitted to a vertical slit in the end of the joist B as shown in Fig. 15, and the wood at each side of the slit clamped firmly upon such plate by bolts $o^2$.

A flange $o^3$ upon the bottom edge of the plate rests upon the under side of the joist to support the load imposed upon the joist. This construction is much more rigid than where a plate is bolted to one side of the joist, and the same construction is therefore employed for the socket-portion of the pivot-hanger which is shown in Fig. 17, which is provided with a socket $t^2$, and with a central plate $o^4$ and a lower flange $o^5$, and secured by bolts $o^2$ extended through the joist. This pivot-hanger is constructed to permit the rocking of the joists, which is clearly shown in Fig. 8$^a$, and is necessitated by their rigid connection with the floor-plates adjacent to the joint A, and it consists of an upwardly projecting hook $u'$, connected by a depending shank $u^2$ with a foot-plate secured to the guard-beam by bolts $u^3$, as shown in Fig. 16.

The joists for the floor-plates are arranged in pairs, and the lifter is applied to one of the joists beneath the joint A, and the other joist in the pair is supported thereby in the following manner.

Figure 12:
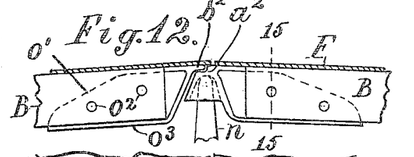
Fig. 12 is a cross section on line 12—12 in Fig. 11.

The top of the socket $u'$ is formed with a transverse convex seat $a^2$ shown in Figs. 12 and 14, and the opposed end of the adjacent joist is formed with a plate $o'$ having a lip $b^2$ to rest upon such convex seat, so that the two joists of each pair are supported upon one lifter.

Figure 11:
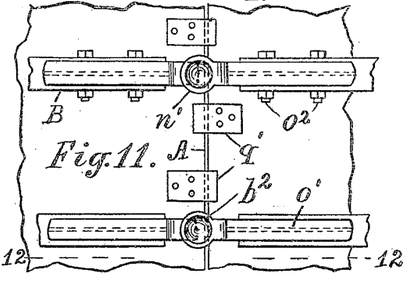
Fig. 11 shows the under side of floor-joists and floor-plates at the center joint of the course.

As the joint A slightly opens and closes as the joists are vibrated to undulate the floor, it is desirable to furnish such joint with means for holding the moving edges flush with one another; which is effected by the plates $q'$ riveted to the alternate edges of the joint as shown in Fig. 11, or by a longitudinal joint-plate or strip $q^2$ lying between the plates F and the castings which carry the socket and the lip $b^2$, as shown in Figs. 13 and 14.

Either the plates $q'$ or the joint-plate $q^2$ forms a guard-plate which is extended across the joint A to keep the same level if the plates $q'$ are used, or to wholly close the joint if the joint-plate $q^2$ be used.

The gearing for driving the various cranks upon the curved portion of the course may be actuated by means similar to that employed upon the straight portions of the course, by securing groups of transverse crank-wheels together upon short sections of supporting beams, and driving such crank-wheels by pinions upon a sectional shaft, the portions of which are coupled together by any species of universal joint. Such an alternative construction is shown in Figs. 1$^a$ to 1$^c$ inclusive, where the bridges $g$ for a straight section of course are shown secured upon beams $f$ the same as in Fig. 3, and other beam-sections $f'$ and $f^2$ are extended at an inclination to the same, with groups of similar bridges $g$ and transverse crank-gears $h$ mounted upon the same, and shaft-sections $c^2$ and $c^3$ connected to the power-shaft $c'$, and to one another by universal couplings $b'$ or $b^2$. The sections $c'$, $c^2$, $c^3$ form a so-called "bent-shaft." Gear-couplings are shown at $b'$ in Figs. 1$^a$ and 1$^c$, and pivoted universal joints at $b^2$ in Fig. 1$^b$. This alternative means for undulating the floor in a curved course produces the same effect upon the floor as the means shown in Figs. 2, 3 and 4, and has one special advantage, namely, that all the crank-gears, crank-shafts and pinions, as well as all the bridges and bearings carried thereby, can be made the same throughout the entire construction.

The use of toothed wheels with crank-gears thereon, or of cranks driven by toothed wheels, enables the cranks to be readily adjusted in different relations upon the different wheels by intermeshing the teeth in a suitable manner, and the same construction thus permits the crank-pins to be spaced progressively in the successive wheels in any given order, so as to produce a wave-motion in eight feet, sixteen feet, or intermediate lengths; and the gearing described herein may therefore be used to produce waves of different lengths in different parts of the same floor; which greatly diversifies the effect upon the vehicle and the interest of the passenger in riding over the course. With the joists one foot apart and the cranks spaced one-sixteenth of a circle apart in one part of the floor, the waves propel the vehicle with considerable velocity, while the same gearing, crank-pins and connections may, by spacing the crank-pins one-eighth or one-tenth of a circle apart, produce waves eight or ten feet long in the same space of time, and thus propel the vehicle at a slower rate.

Figure 1A:
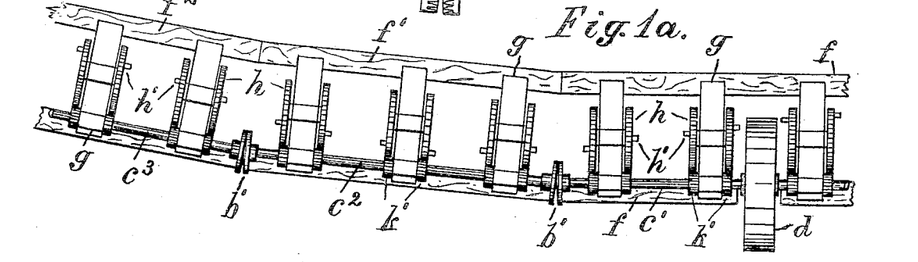
Figure 1B:
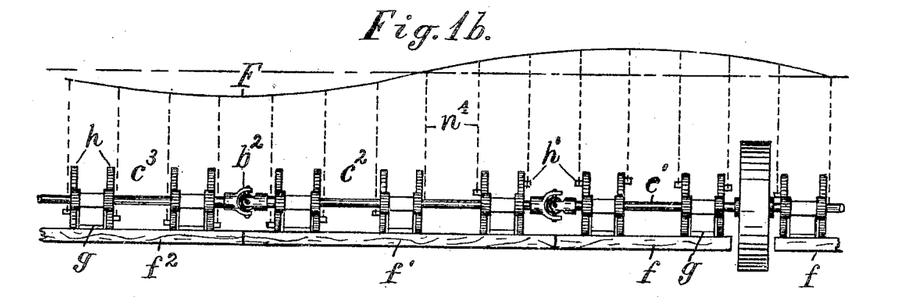

The crank-pins $h'$ shown in Figs. 1$^a$ and 1$^b$ are arranged one-sixteenth of a circle apart upon the series of crank-wheels in those figures, thus producing a wave sixteen feet in length, as indicated by the line F in Fig. 1$^b$.

As the mechanism described enables me to undulate the floor upon a curved course, it is immaterial what curves be used to unite the opposite ends of the straight side-courses $a$ and $a'$, and the loops $b$, $b'$ may, when desired, be made much flatter upon one side, that is more in a line with the straight course $a$, and bulging or curved upon the opposite side, which connects with the ends of the course $a'$.

In practice, the undulating floor has been made 160 feet long from the end of one loop to the end of the other, with floor-joists 11 feet long, making the course 22 feet wide, with waves in different parts of the course having a pitch from center to center of various lengths.

Figure 7A:
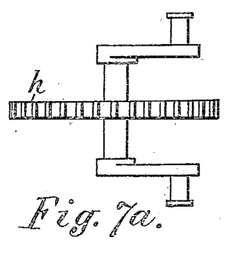

I claim herein a series of gear-wheels connected together and journaled or mounted to rotate beneath the said joists, with a crank-pin upon each wheel and a lifter connecting each crank-pin with the joists to operate the same; but it is not essential that the crank-pin should be literally attached to the gear-wheel, as any of the crank-wheel-shafts shown in the drawing may be readily provided with a crank-arm $h^2$ and crank-pin $h^3$ upon one end, and with a toothed cog-wheel $m^3$ to drive the same at the opposite end, as at Fig. 3ª; or in the middle of the crank-shaft in the case of the gears $h$, (see Fig. 7ª). It is also immaterial that the crank-wheels be meshed together if formed with a toothed periphery, as teeth suitable to receive a sprocket-chain may be used and a chain applied to the same side of all of the wheels to drive them in unison.

Heretofore great expense has been incurred to balance the uniform dead weight which is imposed upon the various lifters; but no balancing mechanism is required where all the lifters are actuated by cranks and all the cranks are geared together by suitable connections, as the dead load upon each crank is exactly balanced by the dead load upon a crank in the opposite position. For this reason, the chief power required in undulating the floor is expended in lifting the vehicles and passengers which constitute the movable load upon the floor, when such vehicles are in the troughs between the crests of the waves, which lifting is the means of propelling the vehicles forward.

It will be understood that the height of the waves as well as their pitch or length can be varied by suitable disposition of the crank-pins, as the height is varied by placing the crank-pin nearer to the center of the gear or crank; which is necessarily done by gradually shortening the stroke of the crank-pins upon the gears or cranks adjacent to the dead line E, E. Such shortening of the stroke is indicated in the crank in Fig. 3ª where the crank-pin is shown nearer to the shaft than upon the gears $m$ in Fig. 3.

Heretofore, the corners of such amusement apparatus have been made straight and connected at the corners, but the use of expanded loops to connect two parallel courses greatly facilitates the construction and operation of an amusement apparatus having a continuous course, as the straight portions are connected with the turns by easy curves which permit the use of the machinery specifically claimed herein for vibrating the floor on corners, and shown in Figs. 1ª and 3. Such machinery could not be used upon abrupt corners, but its use conduces to economy of both construction and operation, if expanded loops be used to connect the straight portions and thus form a continuous course without abrupt turns or corners at any point.

Having thus set forth the nature of the invention what is claimed herein is:

1. In an amusement apparatus having an undulating floor, the combination, with a series of floor-joists having flexible floor-plates thereon, of a series of gear-wheels connected together and journaled beneath the said joists, one for each, a crank-pin driven by each gear-wheel, and a lifter rod connecting each crank-pin with one of the joists to oscillate the same.

2. In an amusement apparatus having an undulating floor, the combination, with a series of floor-joists in pairs having flexible floor-plates thereon, of a series of gear-wheels connected together and journaled beneath the said joists, one for each, crank-pins one upon each gear-wheel spaced progressively with reference to their rotations and having each a lifter connected to one of the floor-joists, whereby the joists are oscillated progressively to produce a wave-motion of the floor.

3. In an amusement apparatus having an undulating floor, the combination, with a series of floor-joists in pairs having flexible floor-plates thereon, of a series of gear-wheels one for each joist set parallel to the joists with crank-pins and lifters to oscillate the joists, and a driving-shaft at the side of the series with pinions meshing in the several gear-wheels to drive them all in unison.

4. In an amusement apparatus having an undulating floor, the combination, with a straight course having transverse parallel joists thereunder and means for oscillating the joists, of a curved course connected to the straight course and having divergent joists with means for oscillating the same in unison with the parallel joists.

5. In an amusement apparatus having an undulating floor, the combination, with a straight course having transverse parallel joists thereunder and a series of lifters for oscillating the said joists, of a curved course connected to the straight course and having divergent joists, and a series of lifters for oscillating the divergent joists, and gearing connecting one series of lifters with the other to operate them in unison.

6. In an amusement apparatus having an undulating floor, the combination, with a course having two sides connected by continuously curved loops, of a partition between the two sides of the course to conceal one side of the same from the view of the passengers upon the other side.

7. In an amusement apparatus having an undulating floor, the combination, with a straight course having a series of transverse parallel joists and gears set parallel with the said joists and provided with connections for oscillating the same, of a curved course having a series of divergent joists and connected with the straight course, and having gears set transverse to the divergent joists with connections for oscillating the said joists, and bevel-gearing connecting the series of gears under the straight course with the series of gears under the curved course, as and for the purpose set forth.

8. In an amusement apparatus having an undulating floor, the gearing for progressively reciprocating a series of floor-lifters, consisting of parallel stringers with bridges carrying bearings between the stringers, a gear-shaft fitted to each bearing with a toothed crank-wheel upon each end and a crank-pin in each wheel for actuating one of the lifters, and a power-shaft journaled at the side of the series of gear-shafts and having pinions meshing with the several toothed crank-wheels, to rotate the same in unison.

9. In an amusement apparatus, the combination, with a series of transverse parallel joists supporting flexible floor-plates with a joint along the middle of the course, of two gearing-stringers set parallel with the said joint, a series of metal bridges spanning the stringers with a transverse bearing upon each and a shaft carrying a toothed crank-wheel at each end, means for rotating the crank-wheels, and crank-pins upon the gear-wheels with lifters connected each to one of the floor-joists and the crank-pins suitably spaced apart in the crank-wheels to oscillate the joists progressively.

10. In an amusement apparatus having an undulating floor, the combination, with a straight course having a series of transverse parallel joists and means for oscillating the same progressively, and a connected curved course with divergent joists, of the means for oscillating the divergent joists consisting of gearing-stringers extended transverse to the said joists, a series of bearings and radial shafts extended across the stringers one for each floor-joist with a toothed crank-wheel overhung upon its end, the crank-wheels being meshed together to rotate one another, and having crank-pins fixed progressively thereon, and provided with lifters to oscillate the divergent floor-joists progressively.

11. In an amusement apparatus having an undulating floor, the combination, with two parallel courses, of two curved courses in the form of expanded loops connecting the ends of the parallel courses.

12. An amusement apparatus having an undulating floor and having the floor continuous with curved loops at its opposite ends for the passage of vehicles, the vibrations of the floor being gradually diminished to nothing at the middle part of each loop, whereby the opposite sides of the course need not be undulated in unison.

13. An amusement apparatus with an undulating floor and having a continuous course with parallel sides and with curved loops at its opposite ends for the continuous passage of vehicles, the vibrations of the floor being gradually reduced to nothing at the middle part of each loop, separate trains of gearing for vibrating the floor under the two halves of the course, and a motor with driving-shaft set parallel to the two sides of the course and connected to the two separate trains of gearing.

14. In an amusement apparatus having an undulating floor, the combination, with a series of floor-joists, of means for oscillating the joists at the inner end to vibrate the floor, and a guard-beam supported above the outer ends of the joists with pivot-hangers connecting the ends of the joists to such guard-beams.

15. In an amusement apparatus having an undulating floor, the combination, with a series of floor-joists in pairs, of means for oscillating their adjacent ends to vibrate the floor, guard-beams supporting the outer ends of the floor-joists, and pivot-hangers connecting the ends of the joists with such guard-beams.

16. In an amusement apparatus having an undulating floor, the combination, with transverse oscillating floor-joists, of longitudinal floor-plates F having joints with cross-bars or cross-plates extended across these joints and riveted to the floor-plates at opposite sides of the joint.

17. In an amusement apparatus having an undulating floor, with transverse floor-joists pivoted at their outer ends and oscillated along the center line of the course, the combination, with the floor-plates having an open joint along the center line, of the guard-plates secured to the said floor-plates and extended across the joint to close the same.

18. An amusement apparatus having an undulating floor with the transverse floor-joists pivoted at their outer ends, a socket-casting upon one of the adjacent ends with a casting upon the opposite end having a lip resting thereon, the castings lying below the surface of the floor-joists, floor-plates attached to the joists with an open joint over the junction of such castings, and a longitudinal joint-plate supported upon the castings beneath such open joint to close the same.

19. In an amusement apparatus having a longitudinal course, the combination, with a vibrating flexible floor having joists with pivots at the outer edges of the floor and oscillated along an open joint at the center line of the course, of longitudinal floor-plates $h$ with close joints at their margin and cross-bars or cross-plates extended across the close joints and riveted to the floor-plates at opposite sides of the same, and guard-plates supported beneath the open joint at the center of the course to close the same.

20. In an amusement apparatus having an undulating floor, the combination, with a series of floor-joists with pivots at the edges of the floor, of means for oscillating the joists at their inner ends to undulate the floor, a guard-beam supported at the outer ends of the joists, floor-plates secured upon the joists and extended to the guard-beam and fastened thereto, and pivot-hangers connecting the guard-beam with the outer ends of the joists beneath such floor-plate.

21. In an amusement apparatus having an undulating floor, the combination, with transverse floor-joists pivoted at one end, of means for oscillating the opposite end to vibrate the floor, floor-plates attached rigidly to the joists near one end, and the tops of the joists rounded beneath the floor-plates from the pivoted end nearly to the oscillated end.

22. In an amusement apparatus having an undulating floor, the combination, with transverse floor-joists with floor-plates extended longitudinally over the same, of auxiliary plates inserted between the floor-plates and the joists and secured to the joists and attached at their edges to the floor-plates.

23. In an amusement apparatus having a curved course with undulating floor, the combination, with joists set radially across such course, of longitudinal floor-plates extended transversely of the joists with radial joints at their ends, and one of their longitudinal edges trimmed with two lines at right angles to such radial ends.

In testimony whereof I have hereunto set my hand in the presence of two subscribing witnesses.

THEOPHILUS VAN KANNEL.

Witnesses:
    FRED FIEN,
    B. F. VAN KANNEL.